United States Patent
Rocher et al.

(10) Patent No.: US 11,603,806 B2
(45) Date of Patent: Mar. 14, 2023

(54) SYNCHRONIZATION OF AN INTERNAL COMBUSTION ENGINE

(71) Applicant: VITESCO TECHNOLOGIES GMBH, Hanover (DE)

(72) Inventors: Jacques Rocher, Toulouse (FR); Yannick Leroy, Toulouse (FR); Benjamin Marconato, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 17/414,744

(22) PCT Filed: Dec. 19, 2019

(86) PCT No.: PCT/EP2019/086368
§ 371 (c)(1),
(2) Date: Jun. 16, 2021

(87) PCT Pub. No.: WO2020/127776
PCT Pub. Date: Jun. 25, 2020

(65) Prior Publication Data
US 2022/0074360 A1    Mar. 10, 2022

(30) Foreign Application Priority Data

Dec. 19, 2018 (FR) ...................... 1873377

(51) Int. Cl.
*F02D 41/00* (2006.01)
*F02D 41/28* (2006.01)
(Continued)

(52) U.S. Cl.
CPC ........... *F02D 41/009* (2013.01); *F02D 41/28* (2013.01); *G06F 7/58* (2013.01); *G06F 7/588* (2013.01);
(Continued)

(58) Field of Classification Search
CPC ...... F02D 41/00; F02D 41/009; F02D 41/028; F02D 2041/285; F02D 2041/286;
(Continued)

(56) References Cited

U.S. PATENT DOCUMENTS 9,252,945 B2  2/2016 Lewis et al.
9,575,933 B2  2/2017 Boehl
(Continued)

FOREIGN PATENT DOCUMENTS

CN  102822484 A  12/2012
CN  103152733    6/2013
(Continued)

OTHER PUBLICATIONS

International Search Report and Written Opinion of the ISA for PCT/EP2019/086368 dated Mar. 20, 2020, 13 pages.
(Continued)

*Primary Examiner* — John Kwon
*Assistant Examiner* — Johnny H Hoang
(74) *Attorney, Agent, or Firm* — Nixon & Vanderhye

(57) ABSTRACT

Sensor delivering detection information in the form of a variation of a current, including a sensitive portion adapted to detecting the passage of a mobile target, an electronic module able to control and shape signals coming from the sensitive portion, an embedded intelligence module adapted, inter alia, to receive information from an electronic computer and to process and generate information intended for the electronic computer, characterized in that the sensor includes a random-number generation module able to generate a random number.

14 Claims, 2 Drawing Sheets

(51) Int. Cl.
*G06F 7/58* (2006.01)
*G06F 17/17* (2006.01)

(52) U.S. Cl.
CPC ........ *G06F 17/17* (2013.01); *F02D 2041/285* (2013.01); *F02D 2041/286* (2013.01); *F02D 2250/12* (2013.01); *F02D 2250/14* (2013.01)

(58) Field of Classification Search
CPC .... F02D 2250/12; F02D 2250/14; G05F 7/58; G05F 7/588; G05F 17/17; G01D 5/24; G01D 5/2457; G01M 15/04; G01M 15/046
See application file for complete search history.

(56) References Cited

U.S. PATENT DOCUMENTS

| | | | |
|---|---|---|---|
| 9,915,586 | B2 | 3/2018 | Hou |
| 10,085,314 | B1* | 9/2018 | Milanesi ............ H05B 45/3725 |
| 11,112,277 | B2 | 9/2021 | Mirassou et al. |
| 2010/0188071 | A1* | 7/2010 | Kajouke ............ G01R 31/2837 |
| | | | 324/76.39 |
| 2014/0225598 | A1* | 8/2014 | Romero ............... G01R 33/075 |
| | | | 324/207.12 |
| 2014/0360254 | A1 | 12/2014 | Deringer et al. |
| 2015/0268065 | A1 | 9/2015 | Slama et al. |
| 2017/0085177 | A1* | 3/2017 | Jimenez Pino ....... H02M 3/335 |
| 2017/0187541 | A1* | 6/2017 | Sundaresan ............ G01N 27/00 |

FOREIGN PATENT DOCUMENTS

| | | |
|---|---|---|
| CN | 104234768 A | 12/2014 |
| CN | 104747309 A | 7/2015 |
| CN | 104813585 A | 7/2015 |
| CN | 107209025 A | 9/2017 |
| CN | 108019881 A | 5/2018 |
| CN | 108989056 | 12/2018 |
| DE | 10 2013 206 185 A1 | 10/2014 |
| FR | 2 441 829 | 6/1980 |
| FR | 3 068 463 | 1/2019 |
| KR | 10-2018-0109353 | 10/2018 |
| WO | 2009/142505 | 11/2009 |
| WO | 2013/083082 | 6/2013 |

OTHER PUBLICATIONS

Office Action in Chinese Patent Application No. 201980084367.7 dated Oct. 20, 2022.

* cited by examiner

SYNCHRONIZATION OF AN INTERNAL COMBUSTION ENGINE

This application is the U.S. national phase of International Application No. PCT/EP2019/086368 filed Dec. 19, 2019 which designated the U.S. and claims priority to FR Patent Application No. 1873377 filed Dec. 19, 2018, the entire contents of each of which are hereby incorporated by reference.

TECHNICAL FIELD

The present invention generally relates to the techniques of synchronizing an internal combustion engine. More specifically, it relates to a device and a method for determining the state of rotation of at least one camshaft of a heat engine.

PRIOR ART

The control of the performance of an internal combustion engine, as well as the control of the emission of pollutants, are important parameters for motor vehicle manufacturers. To this end, the position, for example, of the pistons in their respective cylinder during an engine cycle needs to be known with relatively high precision.

Document FR 2441829 discloses means for detecting information relating to the position of the cylinders by identifying, on a target secured to a crankshaft, zones associated with angular positions corresponding to a determined phase of the stroke of different pistons. The secured target is made up of a disk having identification elements disposed along its periphery. A sensor, generally in a fixed position, then detects these identification elements and generates a signal made up of electric pulses allowing the passage, for example, to a top dead center (TDC) of a reference piston to be identified during an intake phase.

However, these identification elements alone are insufficient for precisely knowing the position of the cylinders during the engine cycle. Indeed, for a four-stroke internal combustion engine, the crankshaft completes two revolutions, that is an angle of 720°, before a given piston returns to its initial position. This means that, based solely on the observation of the rotation of the target secured to the crankshaft, it is not possible to provide information concerning each cylinder without uncertainty with respect to two engine strokes in the cycle, the identification of the position of the top dead center covering both an intake phase and an exhaust phase.

Since precise determination of the position of each cylinder during an engine cycle cannot be deduced solely from the observation of the target secured to the crankshaft, finding additional information is therefore necessary in order to know whether the cylinder is in the first or in the second half of the engine cycle, i.e. the intake, then compression phase during the first revolution of the target secured to the crankshaft, or the expansion, then exhaust phase during the second revolution of said target.

In order to obtain such additional information, it is known for a person skilled in the art to use a disk (or target) securely mounted on a camshaft or even on any other shaft that is driven off the crankshaft by means of a ½ reduction gear. Combining signals originating from the crankshaft sensor and from the camshaft sensor allows the system to precisely detect, for example, a top dead center in the intake phase of a reference cylinder.

For the sake of optimal control of the combustion, it is increasingly common for an internal combustion engine to comprise at least two camshafts, with, for example, a first camshaft associated with the exhaust and a second camshaft associated with the intake.

Furthermore, still for the sake of improving the performance of the internal combustion engine, it is also increasingly common for variable valve timing technology to be used, allowing improvement of the synchronization of the opening or closing of the intake or exhaust valves during an engine cycle. Thus, increasing numbers of sensors are used in order to be able to determine the position of the pistons during an engine cycle.

FIG. 1 illustrates a voltage source sensor 2, typical of the prior art, coupled for example to an engine control computer 4. The sensor 2 is, for example, a sensor dedicated to detecting the position of a camshaft of an internal combustion engine. Such a sensor 2 generally comprises three pins, with a first sensor pin 2_1 coupled, for example, to a first computer pin 4_1, which is intended, for example, to transmit a signal for activating the sensor 2, a second sensor pin 2_2 coupled to a second computer pin 4_2, which is intended to receive a signal representing the position of the camshaft, and, finally, a third sensor pin 2_3 coupled to a third computer pin 4_3, which is generally coupled to an electrical ground of the vehicle.

FIG. 2 shows a current source sensor 6 as disclosed, for example, in patent application FR1756119. This sensor 6 operates and is coupled to the engine control computer 4 using only two pins. For example, a first sensor pin 6_1 is coupled to the first computer pin 4_1, a second sensor pin 6_2 is coupled to the second computer pin 4_2. Thus, for performance levels identical to those of a voltage source sensor 2, one pin is freed up on the engine control computer 4, thus enabling savings with respect to the amount of wiring but also with respect to connectors.

The current source sensor 6 delivers information in the form of a rectangular "current" type signal. Thus, for a current sensor, two current levels are possible and they represent the presence or the absence of a tooth of the target in front of the sensor 6.

In order to further reduce the amount of wiring, patent application FR1756119 proposes parallel coupling of at least two current source sensors 6; such coupling is possible using a current measurement device called a "shunt". Thus, for example, it is possible to couple at least two current source sensors 6 on only two wires.

However, with such a setup, the current levels representing the presence or the absence of teeth in front of the current source sensors 6 sometimes coincide and it is difficult to determine the passage of a tooth past a sensor. Furthermore, it is also difficult to determine the source of the detected change in current level.

SUMMARY OF THE INVENTION

The invention proposes a device that provides a partial or full solution to the technical shortcomings of the cited prior art.

To that end, a first aspect of the invention relates to a sensor delivering detection information in the form of a variation of a current, comprising a sensitive portion adapted to detecting the passage of a mobile target, an electronic module able to control and shape signals coming from the sensitive portion, an embedded intelligence module adapted, inter alia, to receive information from an electronic computer and to process and generate information intended for said electronic computer, the sensor comprising a random-number generation module able to generate a random number.

As a variant, the random-number generation module is adapted to generate a random number intended for the embedded intelligence module.

For example, the random number generated by the random-number generation module is dependent on a serial number of said current source sensor.

It is also for example proposed that the embedded intelligence module be adapted to count down from the random number generated by the random-number generation module.

For example, the embedded intelligence module is adapted to count down at a determined frequency.

A second aspect of the invention proposes an assembly of at least two current source sensors coupled electrically in parallel.

For example, it is proposed that the two sensors are coupled to an electronic computer.

A third aspect of the invention also proposes a method for determining the state of rotation of at least one rotary shaft of an internal combustion engine using at least two current source sensors as claimed in the preceding claims, the method exhibiting the following steps:

a. a first step e1, consisting in activating at least two current source sensors once a source of electrical power has been supplied to said current source sensors, b. a second step e2 consisting, once a source of electrical power has been supplied to the current source sensors, in activating a random-number generation module for each sensor so as to generate a random number, c. a third step e3 consisting, as long as an interrupt signal is not received by the embedded intelligence module for each sensor, in performing a countdown from the random number as far as a value of 0 before moving on to a fifth step e5 and, where appropriate, moving on to a fourth step e4, d. the fourth step e4 consisting, in respect of the sensor that has received the interrupt signal, in modifying a first low level into a second low level and modifying a first high level into a second high level, e. the fifth step e5 consisting in generating an interrupt signal sent toward the other current source sensor.

For example, according to the method of the invention, there is performed, after the fourth step e4 or the fifth step e5, a sixth step e6 consisting in measuring and transmitting to the electronic computer information reflecting the movements of said targets.

In a variant, the random number is comprised between 1 and 1000.

It is also possible for example for the random number to be multiplied by a serial number of the current source sensor.

As a variant, the interrupt signal is a pulse train.

BRIEF DESCRIPTION OF THE DRAWINGS

Further features and advantages of the invention will become more clearly apparent from reading the following description. This description is purely illustrative and should be read with reference to the attached drawings, in which.

DESCRIPTION OF THE EMBODIMENTS

Figure 1:
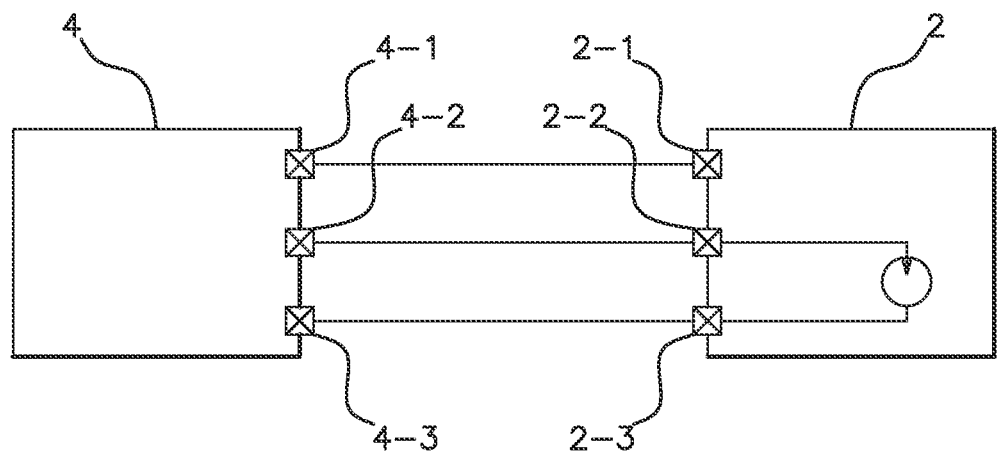
FIG. 1 shows a schematic view of a computer coupled to a voltage-source sensor.
Figure 2:
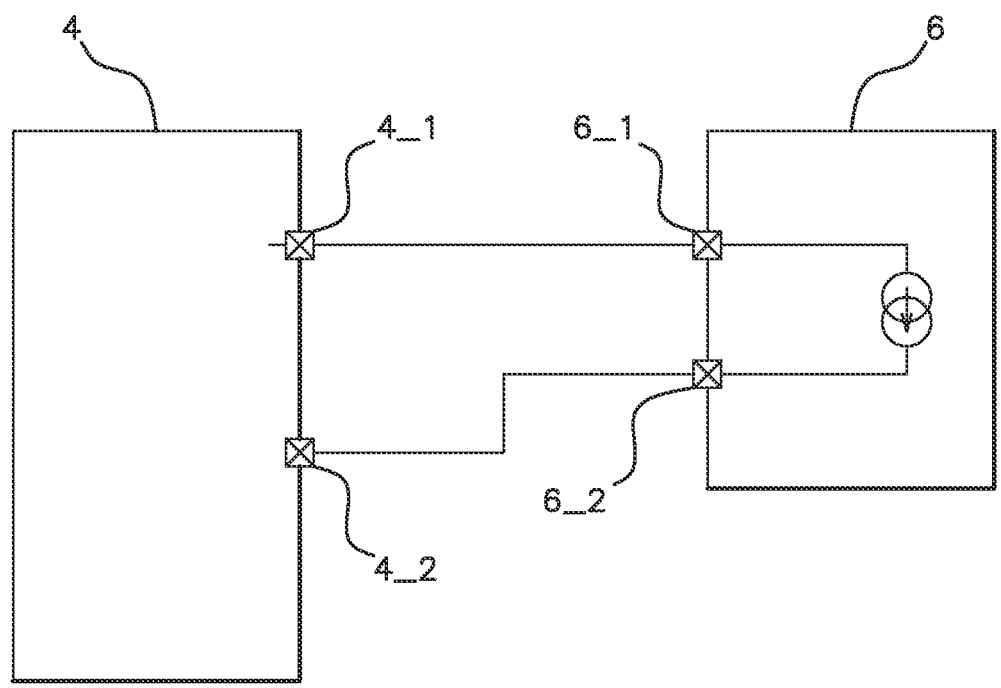
FIG. 2 shows a schematic view of a computer coupled to a current-source sensor.

An internal combustion engine comprises a determined number of pistons that can move in combustion chambers. The energy generated in the combustion chambers by the combustion of a fuel in said chambers is transferred by the pistons to the same engine shaft, also called crankshaft, or sometimes in the remainder of the description called "crank" or known by the abbreviation CRK. The intake of fuel and the exhaust of the combustion gases most often occur using valves controlled by at least one camshaft cooperating with the crankshaft, and sometimes known in the remainder of the description by the abbreviation CAM.

In order to know the position of the pistons in the cylinders during the operation of the internal combustion engine, i.e. during an engine cycle, a first target secured to the crankshaft is generally used to determine an angular position corresponding to a determined phase of the stroke of the various pistons. The first target is produced using a disk having identification elements disposed along its periphery, such as, for example, teeth. In order to know a reference point, for example, a top dead center of a piston, which is also a reference, a mechanical anomaly is generally used, i.e. one (or more) missing teeth on the periphery of the first target. Of course, the first target can comprise a variable number of teeth as a function of the desired precision.

As previously stated, in order to detect the movement of the first target during an engine cycle, a first sensor is used to detect the passage of the teeth past a sensitive portion of said first sensor. The first sensor uses, for example, Hall-effect technology and generates a voltage peak during the passage of a tooth of the first target.

In an alternative embodiment, the first sensor can be a current source sensor allowing a substantial reduction in the amount of electric wiring between said first sensor and the computer responsible for engine management.

The method of the invention will be presented in the case of an internal combustion engine with two camshafts. A first camshaft mounted on an intake controls the opening and the closing of the intake valves. The number of controlled intake valves can vary as a function of the type of internal combustion engine. A second camshaft for its part is mounted on the exhaust. This second camshaft is adapted to control exhaust valves. Of course, the number of controlled exhaust valves can vary.

The first camshaft is coupled to a second target that is secured to the first camshaft. Similarly, the second camshaft comprises a third target secured to the second camshaft.

The second target is, for example, a disk having a determined number of teeth on its periphery. The third target secured to the second camshaft is also a disk having a determined number of teeth on its periphery. In general, as known by a person skilled in the art, the second target and the third target are driven off the crankshaft by means of a ½ reduction gear. Thus, the second target and the third target complete one revolution for two revolutions of the first target. Throughout the remainder of the embodiment of the invention, the second target and the third target are identical and each have two teeth. The two teeth of the same target have different profiles, for example, two different lengths.

In order to deduce the position of the pistons in the cylinders during an engine cycle, a second sensor and a third sensor are advantageously used. For example, the second sensor is fixedly mounted opposite the second target and the third sensor is fixedly mounted opposite the third target.

In a preferred embodiment of the invention, the second sensor and the third sensor are current generator sensors. Furthermore, they are preferably coupled together in parallel. Thus, by virtue of this coupling and the current source technology of the two sensors, the saving with respect to the amount of wiring between the second sensor, the third sensor and the computer responsible for engine management is improved.

Figure 3:
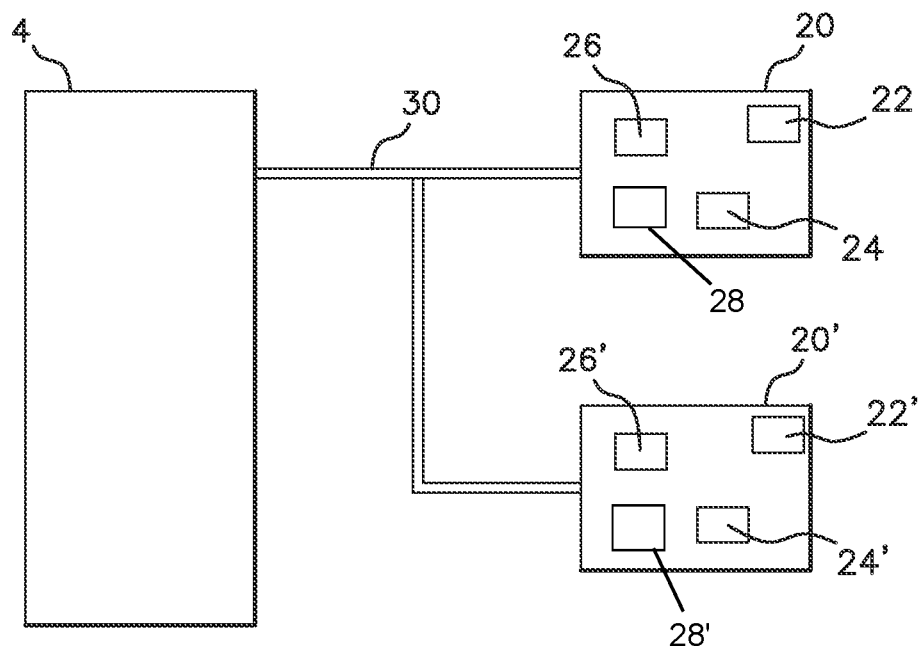
FIG. 3 shows a schematic view of a sensor according to the invention.

FIG. 3 illustrates a current source sensor 20 according to the present invention. This sensor comprises a sensitive portion 22 adapted to detecting the passage of teeth of a target, an electronic module 24 able to control and shape signals coming from the sensitive portion 22, an embedded intelligence module 26 adapted, inter alia, to receive information from an electronic computer 4 and to process and generate information destined for said electronic computer 4.

The sensor 20 according to the present invention further comprises a random-number generation module 28 able to generate a random number according to a determined strategy. The random-number generation module 28 is cleverly able, as soon as a supply of electrical power is received by the current source sensor 20, to generate a random number and transmit it for example to the embedded intelligence module 26. The random-number generation module 28 may, in one embodiment of the invention, be integrated into the embedded intelligence module 26.

The current source sensor 20 further comprises at least one general communication bus 30 adapted for passing information between the modules of said current source sensor 20 and also between the current source sensor 20, the current source sensor 20' and the electronic computer 4. In order to simplify the understanding of the drawing, the general communication bus is illustrated only between the current source sensor 20, the current source sensor 20' and the electronic computer 4. Furthermore, the current source sensor 20, the current source sensor 20' are coupled in parallel.

The embedded intelligence module 26 is also adapted to perform a countdown from the random number received. The countdown may be paced to a clock frequency identical to an internal clock frequency of said embedded intelligence module 26. The embedded intelligence module 26 is, for example, an ASIC (Application-Specific Integrated Circuit) or a microcontroller.

Cleverly, the embedded intelligence module 26 is also adapted to generating an interrupt signal intended for another current source sensor 20 when the countdown is over, namely reaches the value 0. The interrupt signal may for example be an n-pulse train. The current source sensor 20 is therefore, according to the present invention, able to generate a random number when this sensor is supplied with electrical power, and is able to generate and receive a pulse train according to a determined strategy which will be set out later on in the description.

As mentioned hereinabove, when at least two current source sensors 20, 20' are coupled in parallel it is difficult to differentiate the current levels generated by said current source sensors 20, 20'. Indeed, it is known to those skilled in the art that a current source sensor 20, 20' generates two current thresholds representative of the passage of teeth past the sensitive portion 22, 22' thereof. The current thresholds for each sensor 20, 20' are, for example, a first low level at 7 mA and a first high level at 14 mA. Thus, when, for example, two sensors 20, 20' are coupled in parallel, and at the same time the targets are in perfect phase opposition, the changes in level compensate one another and it is impossible to identify which sensor is detecting a tooth of its associated target and which sensor is detecting a space between two teeth of its associated target.

Cleverly, the current source sensor 20 is adapted to modify current levels indicative of the passage of teeth past the sensitive portion 22 according to a determined strategy which will be set out later. Thus, for example, the sensor 20 exhibits a first low level at 7 mA and a second low level at 10 mA. It further comprises a first high level at 14 mA and a second high level at 20 mA. Thus, it is possible to modify the low current level and the high current level in order to make it possible to identify variations in position of two targets positioned facing two current source sensors 20, 20' even in instances in which the targets are in phase opposition.

Figure 4:
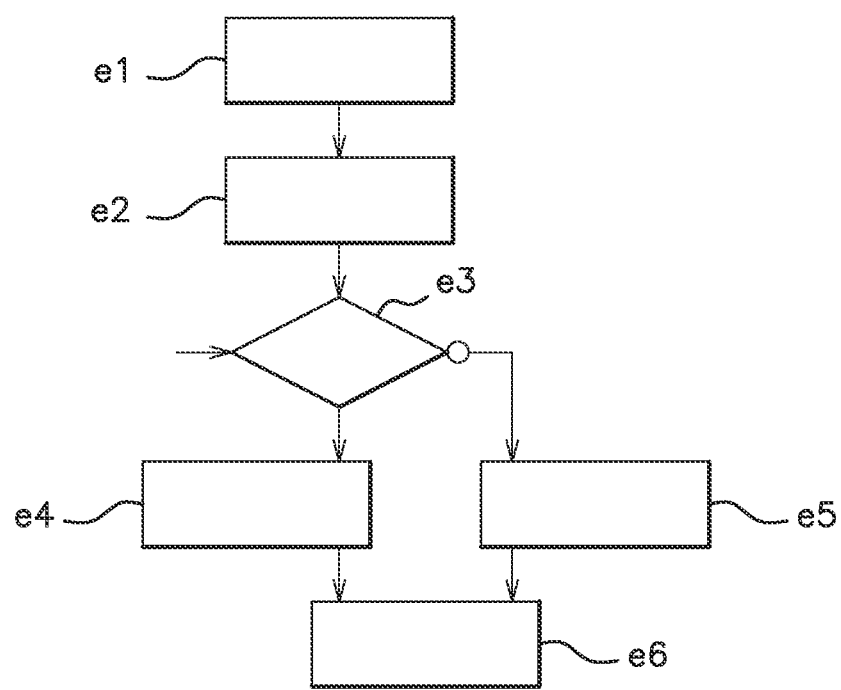
FIG. 4 depicts an algorithm according to the method of the invention.

The invention further proposes a method able to modify current thresholds of a current source sensor 20. FIG. 4 illustrates the method according to the present invention. Of course, the features described earlier in respect of the current source sensor 20 are identical to those of the current source sensor 20'.

The method according to the invention exhibits a first step e1 consisting in activating at least two current source sensors 20, 20' once a source of electrical power has been supplied to said current source sensors 20, 20'. The method of the invention then foresees passing on to a second step e2.

The second step e2 consists, once a source of electrical power has been supplied to the current source sensors 20, 20', in activating a random-number generation module 28, 28' so as to generate a random number. The random number generated may for example be a number comprised between 1 and 1000. As a variant, the random number may be multiplied by a serial number of the current source sensor 20, 20'. Once the random number has been generated by the random-number generation module 28, 28', this number is transferred to the embedded intelligence module 26, 26'. A third step e3 is then executed.

During the third step e3, the embedded intelligence module 26, 26' performs a countdown from the random number received. The countdown is, for example, paced to a clock frequency identical to the internal clock frequency of said embedded intelligence module 26, 26'. Cleverly, during the third step e3, the countdown is performed for as long as an interrupt signal is not received. Said interrupt signal comes from the other current source sensor 20, 20'. Thus, for example, if, before the end of the countdown, the embedded intelligence module 26, 26' has received the interrupt signal, then the method foresees moving on to a fourth step e4, otherwise the method foresees moving on to a fifth step e5 at the end of the countdown.

During the fourth step e4, the method according to the present invention foresees, in respect of the first sensor 20, 20' to have received an interrupt signal, modifying its first low level into a second low level and modifying its first high level into a second high level.

Thus, in this particular instance, the receipt, by the current source sensor 20, of the interrupt signal is synonymous according to the method of the invention with the changing of its low and high levels. Thus, in this example, the current source sensor 20 now has a second low level in place of the first low level and a second high level in place of the first high level.

Furthermore this means, according to the method of the invention, that the sensor 20' (coupled in parallel with the sensor 20) has been the first to complete its countdown from its generated random number and has therefore maintained its first low level and its first high level.

Thus, by virtue of the invention, the current source sensors 20 and 20' may, when connected in parallel, generate variations in level in response to a movement of the targets without these becoming coincident in the event of a movement of said targets that gives rise to a phase opposition.

During a sixth step e6, the current source sensor 20, 20' operate in a normal mode well known to those skilled in the art.

In one exemplary embodiment, the interrupt signal is a pulse train containing n pulses. The pulse train is for example generated by the embedded intelligence module 26, 26' of the sensor that has been the first to complete its countdown. The pulse train is then sent via, for example, a dedicated communication line between the current source sensors 20, 20', by the first sensor to have completed its countdown.

In one exemplary embodiment of the method of the invention, said method is activated each time the current source sensor 20, 20' is powered on.

In a variant, the method of the invention is executed prior to each activation of the thermal combustion engine and thus advantageously enables a distinction between and a determination of the current levels of said sensors.

Of course, those skilled in the art will readily appreciate that it is possible to reverse the decision to change the low and high levels so that it is the sensor (20, 20') that emits the interrupt signal before the end of the countdown from the random number that is the one to change its first low level to a second low level and its first high level to a second high level.

By virtue of the invention, it is now possible to couple two current source sensors in parallel, using software to modify the current levels of at least one of the two sensors in order to facilitate the processing of the information coming from said current source sensors.

The invention claimed is:

1. A current source sensor delivering detection information in a variation of a current, the current source sensor comprising:
    a sensitive portion configured to detect passage of teeth of a mobile target past the sensitive portion;
    an electronic module configured to control and shape signals coming from the sensitive portion;
    a random-number generation module configured to generate a random number; and
    an embedded intelligence module configured to receive information from an electronic computer and the random number from the random-number generation module and to process and generate information intended for said electronic computer, the embedded intelligence module being configured to count down from the random number generated by the random-number generation module while a first interrupt signal is not received from another current source sensor, and to modify a first low level of a second interrupt signal into a second low level and modify a first high level of the second interrupt signal into a second high level when the first interrupt signal is received.

2. The current source sensor as claimed in claim 1, wherein the random number generated by the random-number generation module is dependent on a serial number of said current source sensor.

3. The current source sensor as claimed in claim 1, wherein the embedded intelligence module is configured to count down at a determined frequency.

4. An assembly comprising:
    at least two current source sensors coupled electrically in parallel, each of the at least two current source sensors comprising
    a sensitive portion configured to detect passage of teeth of a mobile target past the sensitive portion,
    an electronic module configured to control and shape signals coming from the sensitive portion,
    a random-number generation module configured to generate a random number, and
    an embedded intelligence module configured to receive information from an electronic computer and the random number from the random-number generation module and to process and generate information intended for said electronic computer, the embedded intelligence module being configured to count down from the random number generated by the random-number generation module while a first interrupt signal is not received from another current source sensor, and to modify a first low level of a second interrupt signal into a second low level, and modify a first high level of the second interrupt signal into a second high level when the first interrupt signal is received.

5. The assembly of at least two current source sensors as claimed in claim 4, wherein the two current source sensors are coupled to the electronic computer.

6. A method for determining a state of rotation of at least one rotary shaft of an internal combustion engine using at least two current source sensors, the method comprising:
    activating the at least two current source sensors when a source of electrical power supplies electrical power to said at least two current source sensors;
    activating a random-number generation module for each of the at least two current source sensors to generate a random number when the electrical power is supplied to the respective current source sensor;
    performing a countdown from the generated random number to a value of 0, until an interrupt signal is received by a respective embedded intelligence module for a respective one of the at least two current source sensors;
    with respect to the respective one of the at least two current source sensors that receives the interrupt signal, modifying a first low level into a second low level and modifying a first high level into a second high level; and
    generating another interrupt signal to be transmitted to another one of the at least two current source sensors.

7. The method for determining the state of rotation as claimed in claim 6, further comprising measuring and transmitting to the electronic computer information reflecting movements of said targets.

8. The method for determining the state of rotation as claimed in claim 7, wherein the random number is comprised between 1 and 1000.

9. The method for determining the state of rotation as claimed in claim 7, wherein the random number is multiplied by a serial number of the respective current source sensor.

10. The method for determining the state of rotation as claimed in claim 7, wherein the interrupt signal is a pulse train.

11. The method for determining the state of rotation as claimed in claim 6, wherein the random number is comprised between 1 and 1000.

12. The method for determining the state of rotation as claimed in claim 11, wherein the random number is multiplied by a serial number of the respective current source sensor.

13. The method for determining the state of rotation as claimed in claim 6, wherein the random number is multiplied by a serial number of the respective current source sensor.

14. The method for determining the state of rotation as claimed in claim 6, wherein the interrupt signal is a pulse train.

\* \* \* \* \*